(12) United States Patent
Kaskawitz et al.

(10) Patent No.: US 7,543,429 B2
(45) Date of Patent: Jun. 9, 2009

(54) VARIABLE SPEED TRANSMISSION ADJUSTABLE TWIST CONTROL APPARATUSES AND METHODS FOR SELF-PROPELLED MOWING MACHINE

(75) Inventors: Scott Kaskawitz, Burlington, NC (US); Brian Bender, Mebane, NC (US); Christopher M. Osborne, Efland, NC (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/925,536

(22) Filed: Oct. 26, 2007

(65) Prior Publication Data

US 2009/0107095 A1 Apr. 30, 2009

(51) Int. Cl.
*A01D 69/00* (2006.01)
(52) U.S. Cl. .................................... 56/10.8; 180/19.3
(58) Field of Classification Search ............... 56/11.1, 56/10.8, 14.7, 16.7, DIG. 18, 10.9, 11.3, 56/11.8, 10.5; 180/19.3, 19.1; 74/501.6, 74/502.2
See application file for complete search history.

(56) References Cited

U.S. PATENT DOCUMENTS

| | | |
|---|---|---|
| 1,902,524 A | 3/1933 | Roth |
| 2,417,613 A | 3/1947 | Radabaugh |
| 3,841,069 A | 10/1974 | Weck |
| 4,019,402 A | 4/1977 | Leonheart |
| 4,133,193 A | 1/1979 | Sanada et al. |
| 4,191,065 A | 3/1980 | Golobay et al. |
| 4,212,363 A | 7/1980 | Letner et al. |
| 4,281,732 A | 8/1981 | Hoch |
| 4,306,405 A | 12/1981 | Fleigle |
| 4,309,862 A | 1/1982 | Carlson |
| 4,327,539 A | 5/1982 | Bricko et al. |
| 4,335,566 A | 6/1982 | Hurd |
| 4,362,228 A * | 12/1982 | Plamper et al. ............. 477/170 |
| 4,466,232 A | 8/1984 | Beugelsdyk et al. |
| 4,476,643 A | 10/1984 | Hilchey et al. |

(Continued)

FOREIGN PATENT DOCUMENTS

EP 0 419 175 3/1991

(Continued)

OTHER PUBLICATIONS

European Patent Office Correspondence dated Dec. 29, 2008 for corresponding European Patent No. 1 721 504.

*Primary Examiner*—Árpád Fábián-Kovács
(74) *Attorney, Agent, or Firm*—Jenkins, Wilson, Taylor & Hunt, P.A.

(57) ABSTRACT

Apparatuses and methods are provided for controlling a self-propelled machine, such as a lawn mowing machine, including a housing, a handle attached to the housing, and a prime mover attached to the housing with a variable speed transmission for propelling the mowing machine. A variable speed adjustable twist control is provided and can include an elongate body moveable in a twisting manner and an adjustable bracket lockably adapted to the elongate body for twisting with the elongate body and the adjustable bracket having an inner channel adapted for guiding a cable control connector operatively connected to the variable speed transmission through a cable for controlling the variable speed transmission, whereby self-propelled speed of the mowing machine can be controlled by operating the adjustable twist control.

9 Claims, 7 Drawing Sheets

U.S. PATENT DOCUMENTS

| | | | |
|---|---|---|---|
| 4,531,347 A | 7/1985 | Schütz | |
| 4,573,307 A | 3/1986 | Wick | |
| 4,667,459 A | 5/1987 | Scanland et al. | |
| 4,704,847 A | 11/1987 | Greider et al. | |
| 4,813,214 A | 3/1989 | Barnard et al. | |
| 4,835,949 A | 6/1989 | Seyerle | |
| 4,882,897 A | 11/1989 | Oshima et al. | |
| 4,901,595 A | 2/1990 | Ozaki et al. | |
| 4,930,369 A * | 6/1990 | Barnard et al. | 74/480 R |
| 4,932,192 A | 6/1990 | Ishimaru | |
| 4,936,160 A | 6/1990 | Barnard et al. | |
| 5,119,632 A | 6/1992 | Nishimura et al. | |
| 5,261,214 A | 11/1993 | Wollersheim | |
| 5,279,101 A * | 1/1994 | Sueshige | 56/11.5 |
| 5,343,678 A | 9/1994 | Stuart | |
| 5,375,674 A | 12/1994 | Peter | |
| 5,545,064 A | 8/1996 | Tsunekawa et al. | |
| 5,784,868 A * | 7/1998 | Wadzinski et al. | 56/10.8 |
| 5,913,802 A | 6/1999 | Mullet et al. | |
| 5,915,487 A * | 6/1999 | Splittstoesser et al. | 180/19.1 |
| 6,047,614 A | 4/2000 | Beugelsdyk et al. | |
| 6,082,083 A | 7/2000 | Stalpes et al. | |
| 6,093,066 A | 7/2000 | Isogawa et al. | |
| 6,516,682 B2 | 2/2003 | Brainard | |
| 6,557,331 B2 * | 5/2003 | Busboom et al. | 56/10.8 |
| 6,668,529 B2 * | 12/2003 | Busboom et al. | 56/10.8 |
| 7,318,309 B2 | 1/2008 | Osborne | |
| 2001/0046819 A1 | 11/2001 | Kawai et al. | |
| 2002/0153179 A1 | 10/2002 | Kobayashi et al. | |
| 2003/0000190 A1 * | 1/2003 | Busboom et al. | 56/10.8 |
| 2003/0192295 A1 * | 10/2003 | Busboom et al. | 56/16.7 |
| 2005/0144919 A1 | 7/2005 | Osborne | |
| 2005/0252185 A1 | 11/2005 | Osborne | |

FOREIGN PATENT DOCUMENTS

| | | |
|---|---|---|
| EP | 1 198 980 | 4/2002 |
| EP | 1 550 364 | 7/2005 |
| GB | 2 166 636 | 5/1986 |
| WO | WO 98/10205 | 3/1998 |

* cited by examiner

VARIABLE SPEED TRANSMISSION ADJUSTABLE TWIST CONTROL APPARATUSES AND METHODS FOR SELF-PROPELLED MOWING MACHINE

TECHNICAL FIELD

The subject matter disclosed herein relates generally to apparatuses and methods for controlling operation of self-propelled machines, and more particularly to providing an adjustable variable speed twist control for controlling a variable speed transmission of self-propelled machines such as lawn mowing machines.

BACKGROUND

Self-propelled machines, such as lawn mowing machines and the like, often provide handles on which controls are mounted for engagement and/or manipulation by operators or users of such machines. In particular, a "walk behind" type, self-propelled mowing machine typically has a handle extending behind a power plant or other main operative assembly of the machine for gripping by an operator as the operator walks behind the machine during movement thereof in a forward direction. Typically, one or location for the user to manipulate while gripping the handle and operating the machine.

One such control is the operator presence control or "dead man" control, which generally includes a spring-biased handle which can be grasped by the operator during normal operation of the machine to enable the motor of the machine. If the operator presence control handle is thereafter released, the machine action is rapidly terminated for reasons of safety. Another well-known control is the speed control, which for self-propelled mowing machines is generally connected to a variable speed transmission associated with the engine and controls the speed of the self-propelled traction wheels. These speed controls typically comprise a lever pivotally mounted onto the machine handle such that the speed of the self-propulsion can be controlled by moving the lever back and forth, which often requires the operator to remove one hand from the handle in order to operate the speed control.

These independent systems also typically require the operator to control two or more separate functions while operating the machine. Many consumers of self-propelled machines prefer a minimum number of control mechanisms requiring manipulation during operation of such machines in order to simplify use of the machines. A solution to this problem, a variable speed twist control, is disclosed in commonly owned U.S. patent application Ser. No. 11/125,843, the disclosure of which is incorporated herein.

Unfortunately, due to the different heights of the operators that use such twist control systems and due to the different ways that operators may operate such twist control systems, a single orientation of the control system on the handle of the lawn mowing machine may not be optimal for use and comfort for every operator. Therefore, it would advantageous to employ an adjustable variable speed twist control that is operatively connected to a variable speed transmission of a self-propelled mowing machine to control the speed of propulsion. The adjustable twist control can allow an operator to adjust the angle of the twist control on the handle of the mowing machine to better accommodate individual users and their preference for ease and comfort of operation.

SUMMARY

According to one aspect, a variable speed, self-propelled mowing machine comprises a housing and a handle attached to the housing. A prime mover is also attached to the housing with a variable speed transmission for propelling the mowing machine. The machine further comprises a variable speed twist control comprising an elongate body moveable in a twisting manner and an adjustable bracket lockably adapted to the elongate body such that the elongate body and adjustable bracket rotate in tandem, the adjustable bracket having an inner channel adapted for guiding a cable control connector operatively connected to the variable speed transmission through a cable for controlling the variable speed transmission, whereby self-propelled speed of the mowing machine can be controlled by operating the twist control.

According to another aspect, a variable speed, self-propelled mowing machine comprises a housing having front, rear, upper and lower portions and a handle attached to the rear upper portion of the housing. An engine is attached to the upper portion of the housing for providing power to the mowing machine. The mowing machine further comprises a variable speed transmission and an adjustable variable speed twist control operatively connected to the variable speed transmission through a cable for controlling the variable speed transmission and self-propelled speed of the mowing machine. The adjustable variable speed twist control comprises an elongate body having two engagement portions on opposing ends and the elongate body being substantially coaxial with a portion of the handle and moveable in a twisting manner. The adjustable variable speed twist control also comprises a lock operably configured to the elongate body and an adjustable bracket, the adjustable bracket operably engaging the lock and comprising an upper portion and a lower portion wherein the upper and lower portions each has an inner helical channel for receiving and guiding a pinion cable control connector operatively connected to the cable whereby rotating the elongate body and hence the adjustable bracket due to the lock causes the pinion to traverse at least partially within the channels to provide movement to the cable. The twist control further comprises a guide bracket disposed between the adjustable bracket and the handle for guiding the pinion cable control connector in a direction at least generally parallel with the portion of the handle coaxial with the twist control. The guide bracket comprises an upper portion and a lower portion wherein each of the upper and lower portions defines a slot therein for passage of at least a portion of the pinion therethrough.

Methods are also provided for controlling propulsion speed of a self-propelled mowing machine. The methods generally comprise providing a variable speed, self-propelled mowing machine with a housing having a prime mover attached to the housing with a variable speed transmission for propelling the mowing machine. A handle can be attached to the housing. The mowing machine provided can further include a variable speed twist control comprising an elongate body lockably adapted to an adjustable bracket, with both being moveable in tandem in a twisting manner. The adjustable bracket of the variable speed twist control can have an inner channel adapted for guiding a cable control connector operatively connected to the variable speed transmission through a cable. The methods further can comprise rotating the twist control to control the variable speed transmission whereby the variable speed transmission controls the propulsion speed of the self-propelled mowing machine.

It is therefore an object of the present disclosure to provide adjustable variable speed twist control apparatuses and methods for controlling a variable speed transmission of a self-propelled machine, such as a lawn mowing machine.

An object having been stated hereinabove, and which is achieved in whole or in part by the subject matter disclosed herein, other objects will become evident as the description proceeds when taken in connection with the accompanying drawings as best described hereinbelow.

DETAILED DESCRIPTION

Figure 1A:
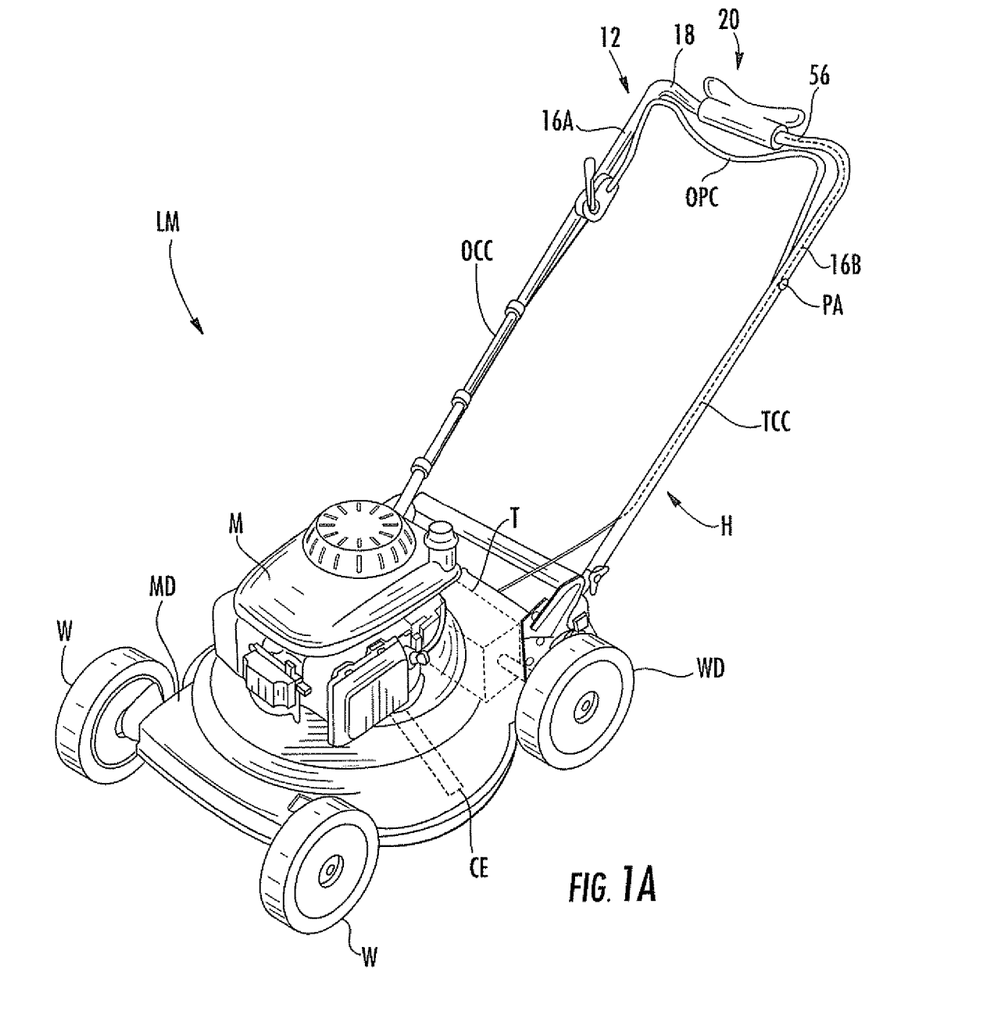
FIG. 1A is a perspective view of a self-propelled mowing machine including an aspect of an adjustable variable speed twist control provided in accordance with the subject matter disclosed herein.
Figure 1B:
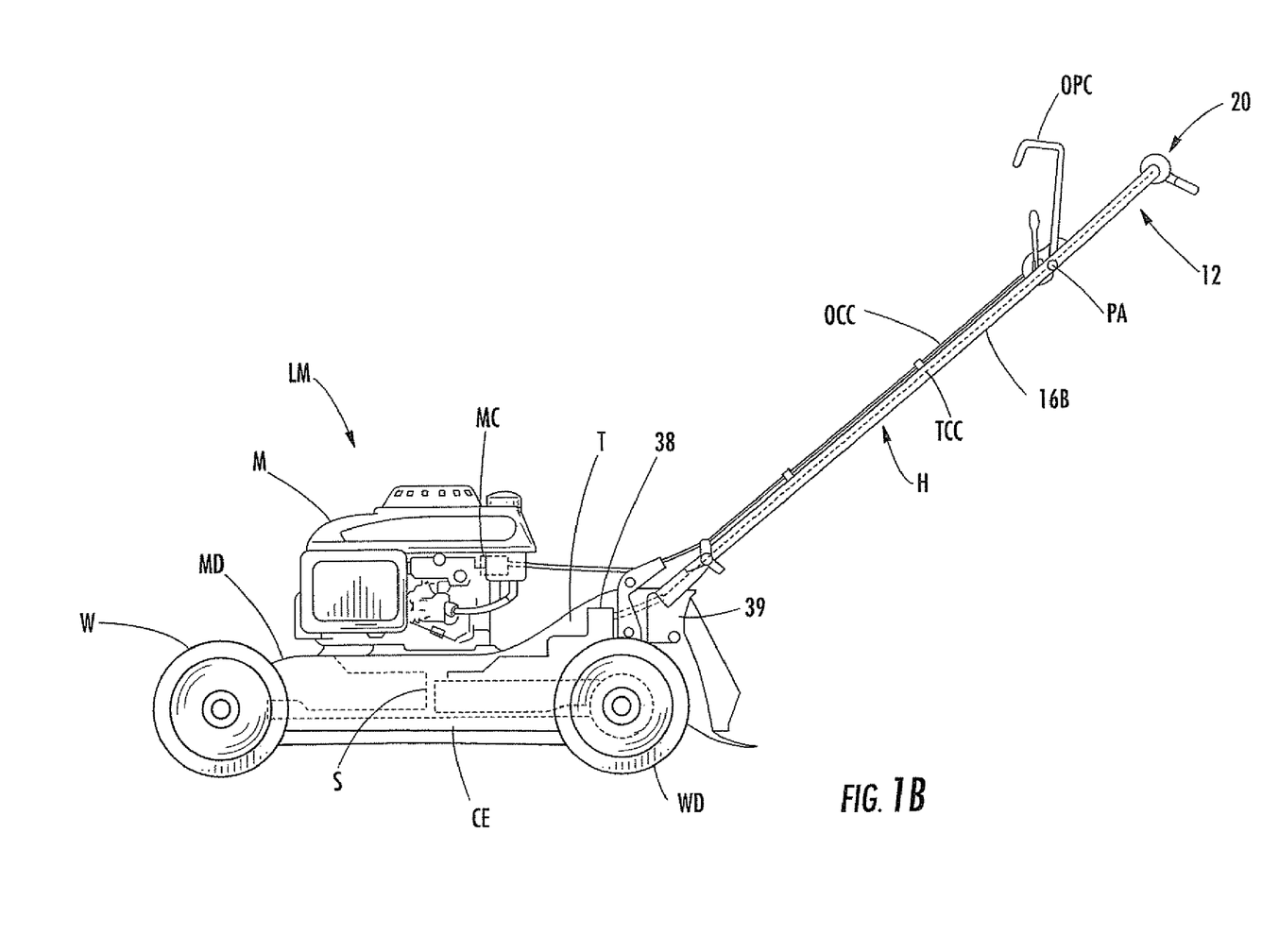
FIG. 1B is a side elevation view of the machine illustrated in FIG. 1A.

Referring now to FIGS. 1A and 1B, a self-propelled lawn mowing machine generally designated LM is illustrated by way of example. Lawnmower LM can comprise any suitable configuration generally known to persons skilled in the art or later developed. In one aspect, lawnmower LM can comprise a housing such as a mower deck MD, which can include a front portion, a rear portion, an upper exterior portion, and a lower, interior portion. A handle generally designated H can be coupled to the rear portion of mower deck MD by any suitable means, and can extend upwardly therefrom at an angle appropriate for comfortable grasping and manipulation by an operator. Handle H provides an area to be gripped by an operator and includes a proximal end section, generally designated 12, which can be the section farthest away from the main operational components of lawn mower LM, such as prime mover or motor M and transmission T. In one aspect, proximal end section 12 of handle H can be generally U-shaped, and thus can include first and second spaced-apart legs 16A and 16B, respectively, joined by a central portion 18.

Mower deck MD can be supported for rolling movement over a surface by a set of wheels and can include one or more idle (non-driving) wheels, such as wheels W, and one or more driving wheels, such as driving wheels WD. There is no limitation as to which one or more of wheels W functions as driving wheel or wheels WD, although typically the rearmost wheel or wheels serve this function.

Lawnmower LM can also include a powered drive system or assembly. The powered drive system can include any suitable prime mover such as motor M, which can be an electric motor or an internal combustion engine. The drive system can further include a transmission T illustrated in phantom in FIGS. 1A and 1B. Both motor M and transmission T can be mounted to the upper exterior portion of mower deck MD in a suitable manner. As shown in FIG. 1B, an output shaft S (shown in phantom) of motor M can rotate a suitable cutting element CE which can be any suitable cutting mechanism such as a blade or blades or disposed within the interior portion of mower deck MD. Motor M also can transfer power to driving wheels WD through transmission T in any suitable manner, thereby rendering lawnmower LM self-propelled in response to control by an operator. Torque from output shaft S can, for example, be transferred to an input shaft (not shown) of transmission T via an endless belt (not shown). Torque from the input shaft can be transferred to an additional output shaft (e.g., an axle or half-shaft coupled to respective driving wheels WD) through an appropriate reducing or transfer means such as a gear set (not shown). Transmission T can be a variable-speed transmission, and can more particularly be a continuously variable-speed transmission. As appreciated by persons skilled in the art, by providing an appropriate control mechanism further defined herein, an operator can control the output speed of a continuously variable-speed transmission, and thus the speed of driving wheels WD, over a continuous or substantially continuous range between a zero or LOW speed and a maximum or HIGH speed.

The different types, structures, and functions of components of lawnmower LM in addition to those described above are known to persons skilled in the art, and therefore are not further described.

As illustrated in FIGS. 1A and 1B, lawnmower LM can include an operator presence control OPC which can be pivotably coupled or attached to handle H at a suitable pivot axis PA which can comprise an axle, pin, bolt, dowel, or the like. Operator presence control OPC can be disposed at or near proximal end section 12 of handle H (i.e., the portion of handle H proximate to an operator in the course of typical use of lawnmower LM) to facilitate manipulation by an operator. As shown in FIG. 1B, operator presence control OPC can communicate with a machine control component MC that is designed for enabling and disabling an engine as appreciated by those skilled in the art. Operator presence control OPC can communicate with machine control component MC through an operator control cable OCC. Operator control cable OCC can be any suitable elongate component, of cable or non-cable material, that is either flexible or ridged and capable of transferring a force or actuation by translation and/or a change in tension. A non-limiting example of operator control cable OCC is a cable, such as a Bowden wire, at least a portion of which is typically encased and extends through a coaxial sheath.

As appreciated by persons skilled in the art, operator presence control OPC in general is a safety feature that is typically movable between two states or positions, ON and OFF, and typically is biased towards its OFF state. When an operator is operating or manipulating lawnmower LM in an intended matter, such as by properly gripping handle H and pulling operator presence control OPC toward handle H, operator presence control OPC is in the ON position, and this action translates through the length of operator control cable OCC to machine control component MC. The ON position permits machine control component MC to activate motor M and cutting element CE and permits lawnmower LM to be propelled using the power generated by motor M as transferred by transmission T. When, on the other hand, an operator is not operating or manipulating lawnmower LM in an intended matter, such as by releasing or failing to properly grip operator presence control OPC, operator presence control OPC is in the OFF position. The OFF position disables machine control component MC and therein disables motor M, cutting element CE, and/or transmission T. In some aspects and as known to those of skill in the art, a biasing mechanism (not shown) can be employed to bias operator presence control OPC to the OFF position. For example, operator control cable OCC could be biased at some point along its length to maintain a force that tends to pull operator presence control OPC away from handle H to the angled OFF position. As another example, a biasing force could be applied to machine control component MC and transferred through operator control cable OCC to yield the same result.

As illustrated in FIGS. 1A and 1B, lawnmower LM further includes a variable speed adjustable twist control generally designated 20. Adjustable twist control 20 can be rotatably coupled or attached to handle H and can be disposed at or near a proximal end section 12 of handle H, preferably in the center of central portion 18.

Adjustable twist control 20 can communicate with transmission T through a transmission control cable TCC, which similar to operation control cable OCC can be any suitable elongate component capable of transferring a force or actuation by translation and/or a change in tension (i.e., a Bowden wire). As illustrated and discussed in detail with reference to FIGS. 2A-2C and 3A-3C, transmission control cable TCC can have a proximal end 56 and a distal end 39 (also illustrated in FIG. 1B), wherein proximal end 56 can include a cable control attachment 55, shown as a ring, that can be attached to a cable control connector 52, such as a pinion, for operative connection with adjustable twist control 20. Transmission control cable TCC can run or extend from adjustable twist control 20 to transmission T on the outside of handle H typically encased and extended through a coaxial sheath. Transmission control cable TCC can also run or extend on the inside of handle H as shown in FIGS. 1A and 1B, or can run or extend with portions of transmission control cable TCC on both the inside and outside of handle H.

Figure 2A:
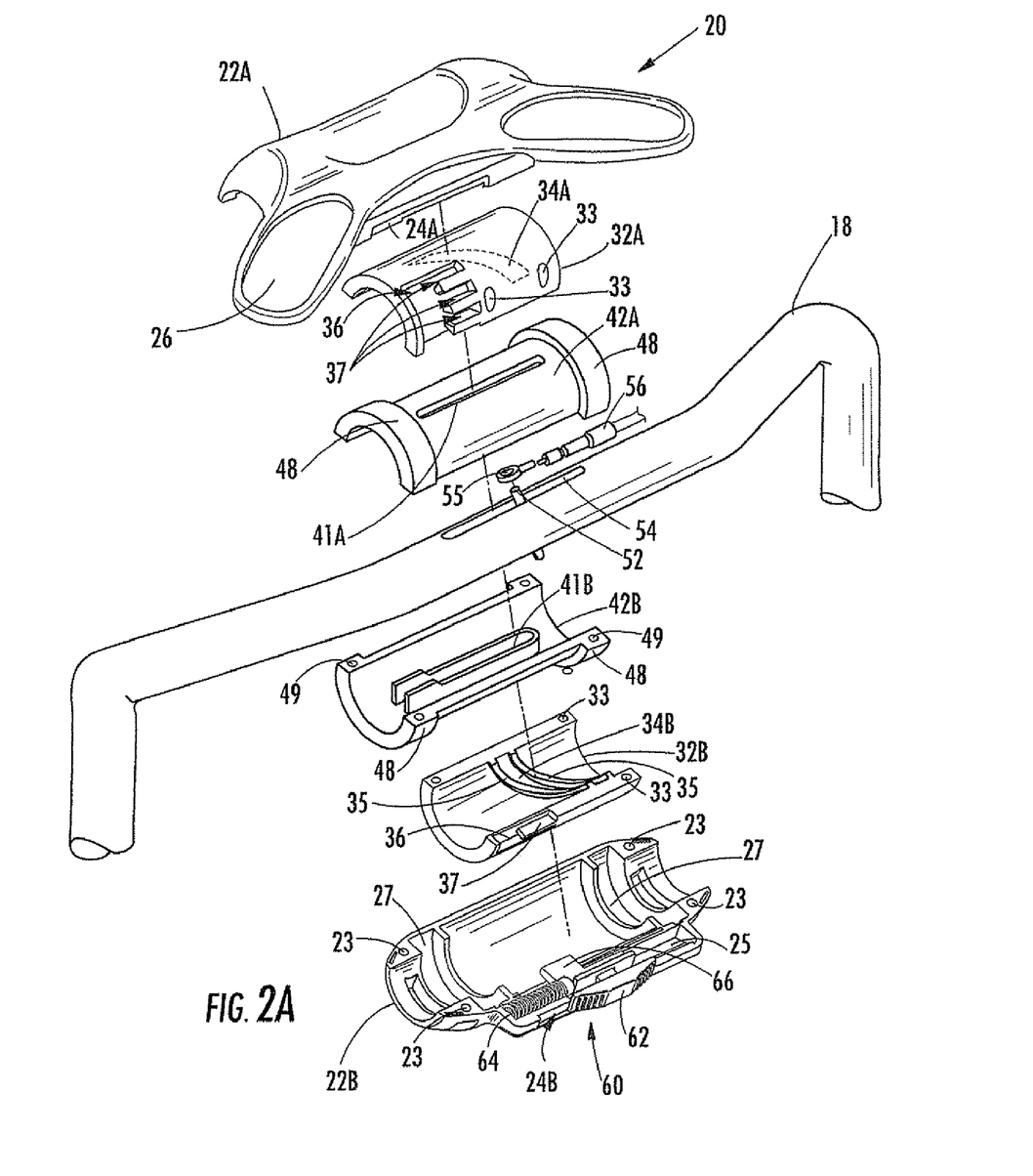
FIGS. 2A-2B are perspective exploded views of the upper section of a mowing machine handle illustrating an aspect of the adjustable variable speed twist control provided in accordance with the subject matter disclosed herein.
Figure 2B:
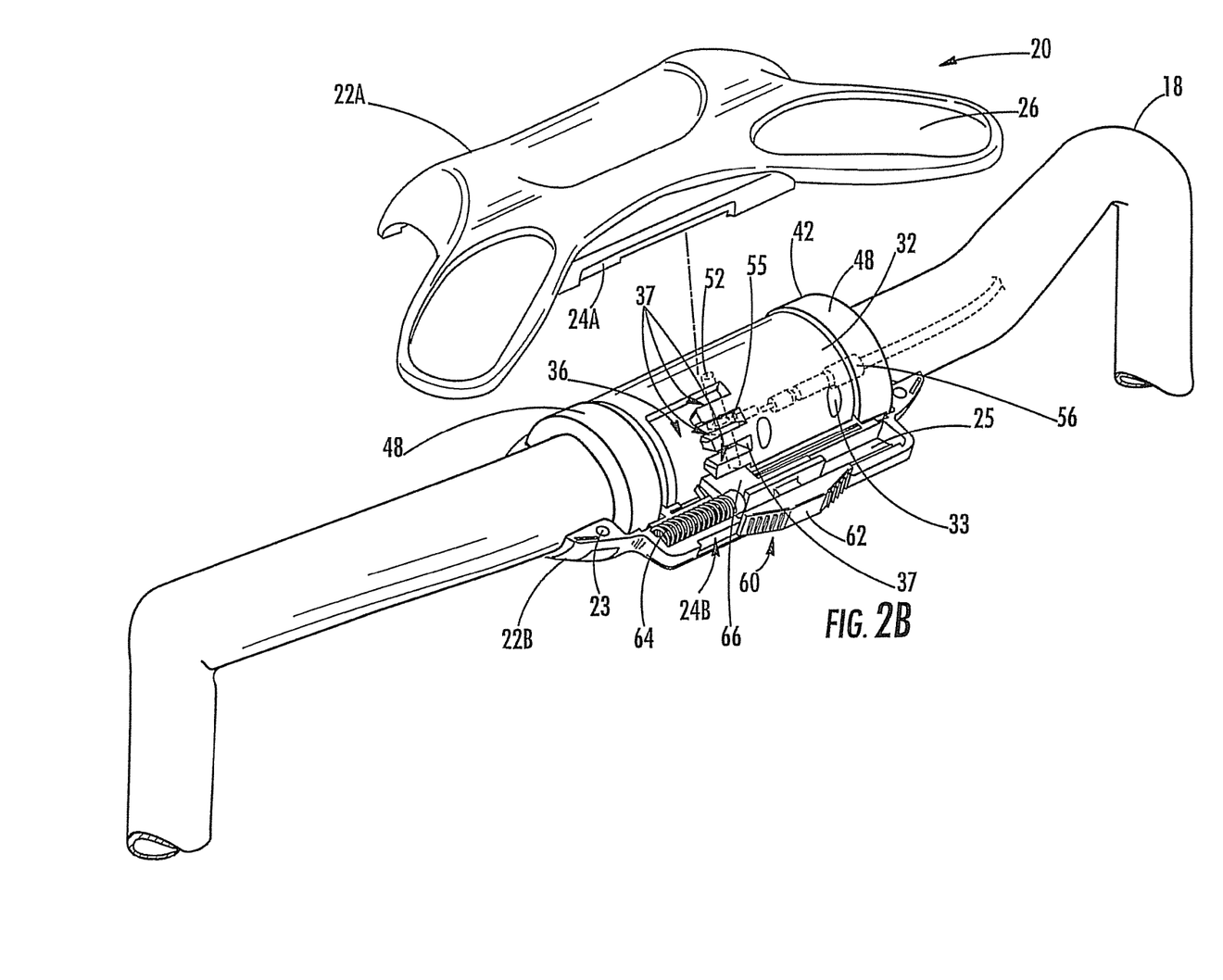
Figure 2C:
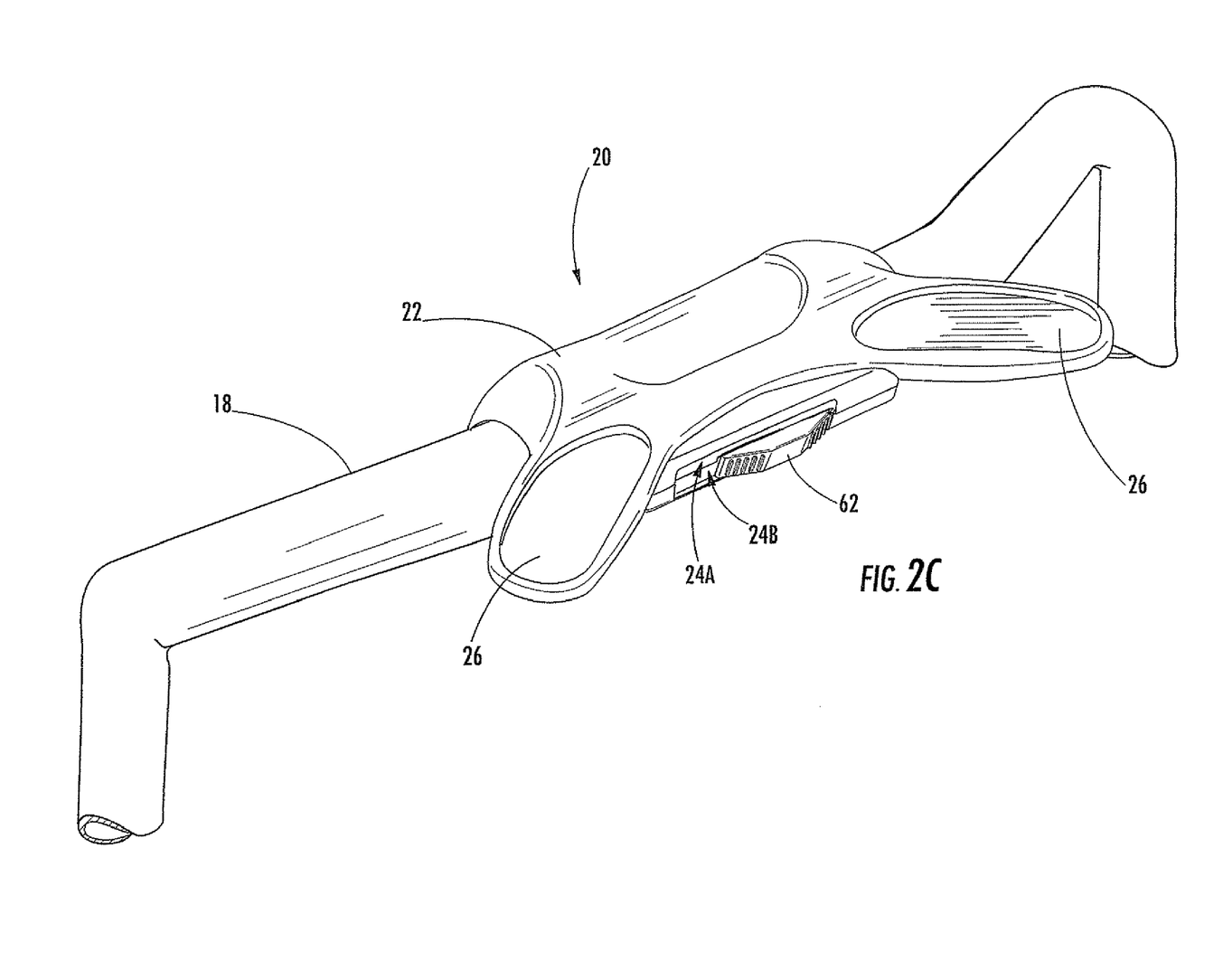
FIG. 2C is a perspective view of an assembled upper section of the mowing machine handle shown in FIGS. 2A and 2B.

Referring now to FIGS. 2A-2C, adjustable twist control 20 can include an elongate body 22 (FIG. 2C) that can be cylindrical in shape and comprise an upper portion 22A and a lower portion 22B. Upper portion 22A and lower portion 22B can be joined together in any suitable manner, such as, for example, with fasteners (not shown) seated within fastener holes 23. It is also envisioned in accordance with the present disclosure that upper portion 22A and lower portion 22B can be formed as a unitary structure. Also, elongate upper and lower body portions 22A, 22B can comprise an elongated recess generally designated 24A and 24B, respectively, for matingly receiving an actuator 62 of a locking device generally designated 60. Elongate body upper portion 22A can further include one or more tabs or engagement portions 26 extending from elongated body upper portion 22A or attached thereto. Engagement portions 26 can be elongated tabs fused to opposing ends of elongate body upper portion 22A, providing a surface that an operator can push with one or more of the operator's thumbs or palms in order to rotate adjustable twist control 20 through the range of operational states. It is also envisioned that adjustable twist control 20 can be configured such that engagement portions 26 extend from lower portion 22B or from both upper portion 22A and lower portion 22B.

Elongate body portions 22A, 22B can each further comprise a bracket channel 27 on opposing ends of each for use in rotating elongate body 22 around handle central portion 18 as will be described in further detail below. Bracket channels 27 can likewise be formed as raised-wall channels or recessed channels. Also, elongate body portions 22A, 22B can comprise an elongated slot 25 in which locking device 60 can be housed.

Adjustable twist control 20 can further comprise an adjustment bracket 32 that can be generally cylindrical in shape and comprise an upper portion 32A and a lower portion 32B as shown in FIG. 2A. Upper portion 32A and lower portion 32B can be joined together in any suitable manner, such as, for example by fasteners (not shown) seated within fastener holes 33. It is also envisioned that upper portion 32A and lower portion 32B can be formed as a unitary structure. Adjustment bracket upper and lower portions 32A, 32B can each further comprise an inside surface channel 34A, 34B, respectively, adapted for guiding cable control connector 52 for controlling variable speed transmission T as described below. Channels 34A, 34B can be defined within raised walls 35 or as any other suitable configuration such as, for example, recessed channels. Channels 34A, 34B can further be at least partially helical in nature as positioned on and disposed about the inner peripheral surfaces of adjustment bracket portions 32A, 32B, respectively.

Adjustment bracket 32 can be positioned between elongate body 22 and a guide bracket 42 as will be discussed below, and adjustment bracket 32 can rotate in tandem with elongate body 22 when twist control 20 is used. Adjustment bracket 32 can wrap around guide bracket 42 and can comprise a passage groove generally designated 36 that runs at least partially around its circumference and can run on upper portion 32A, lower portion 32B, or both upper and lower portions 32A, 32B. A plurality of slots generally designated 37 can extend from passage groove 36 in a perpendicular direction to define a plurality of twist control 20 starting positions that run in the axial direction of adjustment bracket 32. When locking device 60 is housed in elongated slot 25, locking device 60 can engage adjustment bracket 32.

Locking device 60 can have a tab 66 and can be pushed using actuator 62 in a direction towards passage groove 36 causing a spring 64 to be in a compressed state so that elongate body 22 is partially rotatable about adjustment bracket 32 while tab 66 is within passage groove 36. When elongate body 22 is at a desired angle for comfort and use for the individual user, the user can release actuator 62 which releases spring 64 to an uncompressed state and biases tab 66 out of passage groove 36 and into a corresponding slot 37 and starting position at or near the desired angle. At this point, engagement tabs 26 of elongate body 22 can be at the desired angle for the used to use adjustable twist control 20 comfortably. By having different slots 37 extending in the axial direction perpendicular to passage groove 36 along adjustment bracket 32, angular adjustability of adjustable twist control 20 to different starting positions can be achieved. Alternatively, locking device 60 need not have a spring or biasing mechanism. Any suitable locking mechanism can be used to allow adjustment bracket 32 to rotate in tandem with elongate body 22 around guide bracket 42.

Adjustable twist control 20 can further include guide bracket 42 (shown assembled in FIG. 2B) that can be generally cylindrical in shape and can comprise an upper portion 42A and a lower portion 42B as shown in FIG. 2A. Upper portion 42A and lower portion 42B can be joined together in any suitable manner, such as, for example by fasteners (not shown) seated within fastener holes 49. It is also envisioned that upper portion 42A and lower portion 42B can be formed as a unitary structure. Guide bracket 42 is adapted for placement or positioning between adjustment bracket 32 and handle central portion 18 while also being encompassed by elongate body 22 and wherein adjustment bracket 32 and elongate body 22 are capable in tandem of rotating around guide bracket 42 when twisted by a user. For example, guide bracket upper and lower portions 42A, 42B can each further comprise a bracket shoulder 48 on each opposing end. Each bracket shoulder 48 is capable of seating within each respective bracket channel 27 on elongate body portions 22A, 22B, wherein adjustment bracket 32 and elongate body 22 are rotatable in tandem around guide bracket 42.

Guide bracket portions 42A, 42B each can further define slots generally designated 41A, 41B, respectively, through which at least a portion of cable control connector 52 can pass. Slots 41A, 41B, along with slot 54 in handle central portion 18, guide cable control connector 52 in a direction for movement in a direction at least generally parallel with handle central portion 18 when adjustable twist control 20 is operated. The positioning of at least a portion of cable control connector 52 within guide bracket slots 41A, 41B and handle slot 54, allows guide bracket 42 to remain in a non-rotatable fixed position around handle central portion 18, while adjustment bracket 32 and elongate body 22 are cable of rotating in tandem around guide bracket 42 and handle central portion 18 through the seating of guide bracket shoulders 48 within bracket channels 27. Furthermore, the positioning of at least a portion of cable control connector 52 within guide bracket slots 41A, 41B and handle slot 54, allows cable control connector 52 to interact with inside surface channels 34A, 34B of adjustment bracket portions 32A, 32B, respectively, for controlling variable speed transmission T as described below.

While shown in one aspect of the present disclosure, guide bracket 42 could be eliminated. In such an alternate aspect, adjustment bracket 32 can be rotatably attached to handle central portion 18 and elongate body 22 can be adjustably coupled to adjustment bracket 32 to rotate in tandem about handle central portion 18 in a predetermined starting position as described above.

Actuation and the position of adjustable twist control 20 can control the speed at which lawnmower LM is self-propelled. Adjustable twist control 20 can be movable between a NEUTRAL state at which the speed of lawnmower LM can be zero, a LOW state at which the speed of lawnmower LM can be a low speed, and a HIGH state at which the speed of lawnmower LM can be at a maximum operating speed. Adjustable twist control 20 can also be movable to intermediate states between the LOW and HIGH states. In one aspect, adjustable twist control 20 can rotate from approximately 90 degrees to approximately 180 degrees when rotating between a NEUTRAL state and a HIGH state.

In lawnmowers equipped with continuously variable-speed transmissions, the throttle of motor M (when provided as an internal combustion engine) is typically fixed at a constant or substantially constant setting (i.e., the speed of the motor is constant, such as 3100 rpm) during normal cutting operations. Often, this throttle setting corresponds to an optimized motor speed at which components of motor M can rotate in a balanced manner with minimal vibration, while maintaining the effectiveness of cutting element CE. Nonetheless, as appreciated by persons skilled in the art, provision can be made for adjusting the throttle in special circumstances, such as to a choke setting for improved start-up conditions.

As shown in FIG. 1B, due to the normally constant throttle setting, adjustable twist control 20 typically interfaces with transmission T through a transmission control component 38 to adjust one or more components thereof. Accordingly, distal end or end section 39 of transmission control cable TCC is illustrated in FIG. 1B as being connected to transmission control component 38, which in turn is integrally attached to transmission T. Depending on the particular design of transmission T, transmission control component 38 can be mechanically associated with a cam, variable-pitch pulley, dog clutch, cone clutch, friction or pressure plate, gear, fluid control circuit, brake and/or other suitable device as appreciated by persons skilled in the art. The NEUTRAL state of adjustable twist control 20 can correspond to a condition in which such a device decouples power transfer between motor M and transmission T.

In some aspects, adjustable twist control 20 can be biased to the NEUTRAL position by a biasing mechanism (not shown). For example, transmission control cable TCC can be biased at some point along its length to maintain a force that tends to rotate adjustable twist control 20 into the NEUTRAL position. As another example, a biasing force could be applied to transmission control component 38 and transferred through transmission control cable TCC to yield the same result.

Figure 3A:
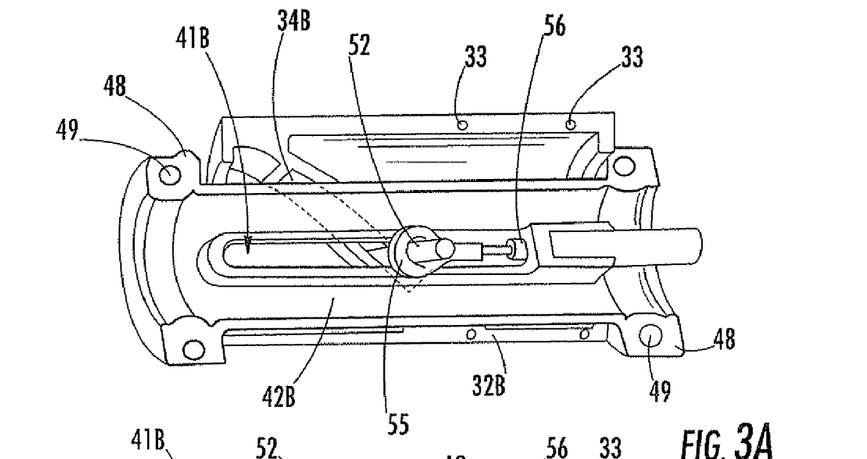
FIGS. 3A-3C are side elevation views of the twist control adjustment bracket lower portion operatively fitted against the twist control guide bracket lower portion illustrating progressive views of rotation of the adjustment bracket lower portion around the guide bracket to move a pinion cable control connector.
Figure 3B:
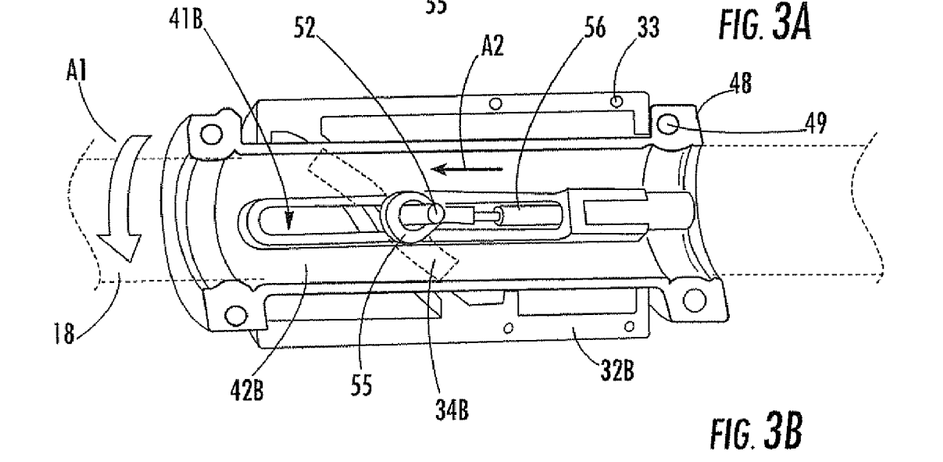
Figure 3C:
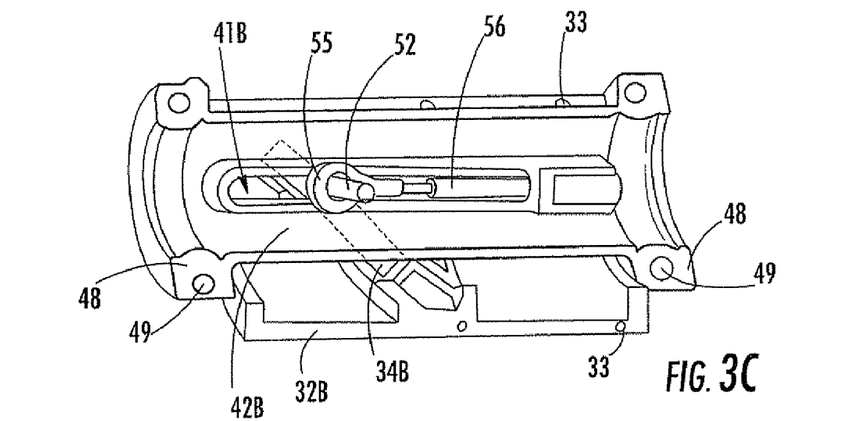

With reference to FIGS. 3A-3C, the operation and positioning of adjustable twist control 20 to actuate transmission control cable TCC and control the speed of a lawnmower will now be described. While FIGS. 3A-3C depict the operation of adjustable twist control 20 through illustrations of cable control connector 52 operating within adjustment bracket lower portion 32B and guide bracket lower portion 42B, it is understood that the operation of adjustable twist control 20 typically requires the operation of cable control connector 52 within both adjustment bracket portions 32A, 32B and both guide bracket portions 42A, 42B when adjustable twist control 20 is rotated about central portion 18 of handle H.

FIG. 3A illustrates adjustable twist control 20 in a zero speed NEUTRAL position at which no power is transferred by transmission T from motor M to driving wheels WD. This can be useful for preventing lawnmower LM from jerking forward immediately upon startup or when an operator otherwise desires for lawnmower LM forward movement to cease. Depending on the type of transmission T with which adjustable twist control 20 is interfaced, the zero speed NEUTRAL position can, if desired, involve a physical detachment in the power transmission path between motor M and driving wheel WD, such as the disengagement of a clutch, or a stoppage in rotation of some critical component such as through application of a braking or friction device. At this NEUTRAL position, cable control connector 52 can be located within a point in channel 34B closest towards transmission T, thereby causing cable control attachment 55 and proximal end 56 of transmission control cable TCC to be in a position closest to transmission T wherein transmission T is disabled.

After motor M has been activated, an operator can rotate adjustable twist control 20 to initiate and increase speed of transmission T and subsequent forward movement of lawnmower LM. As shown in FIG. 3B, an operator can rotate adjustable twist control 20 by causing adjustment bracket 32 and elongate body 22 (represented in FIG. 3A-3C by adjustment bracket 32B and elongate body lower portion 22B) to rotate in tandem around fixed guide bracket 42 (represented in FIG. 3A-3C by guide bracket lower portion 42B) in the direction of arrow A1. While slot 41B in guide bracket lower portion 42B acts as a guide (along with handle slot 54) to direct cable control connector 52 in a direction generally parallel with handle central portion 18, cable control connector 52 is forced along within channel 34B as adjustable twist control 20 is further rotated. This travel or motion within channel 34B causes cable control connector 52 to move cable control attachment 55 and transmission control cable proximal end 56 in a direction of arrow A2, thereby moving proximal end 56 of transmission control cable TCC to a position further from transmission T. This action increases the speed of transmission T and the forward speed of lawnmower LM.

An operator can adjust the speed of lawnmower LM by rotating adjustable twist control 20 within the linear range of travel between an extreme LOW speed position and an extreme HIGH speed position. As shown in FIG. 3C, when adjustable twist control 20 is at least approximately in its HIGH speed position, cable control connector 52 is located within a point in channel 34B furthest from transmission T. This positioning causes proximal end 56 of transmission control cable TCC to be in a position furthest from transmission T wherein transmission T is at its highest speed and self-propelled movement of lawnmower LM is at its highest speed.

Upon completion of mowing activity or in any situation when self-propulsion of lawnmower LM must be slowed down or stopped, an operator can merely release adjustable twist control 20. Tension in the cable assembly can then allow elongate body 22 to rotate back around guide bracket 42 in a direction opposite that of arrow A1 shown in FIG. 3B. This action causes cable control connector 52 to traverse within channel 34 in an opposite manner of that when increasing forward speed, thereby moving cable control attachment 55 and transmission control cable proximal end 56 back to a position closest to transmission T (the NEUTRAL position). Upon reaching the NEUTRAL position (FIG. 3A), transmission T is disabled and assisted propelling forward movement of lawnmower LM will cease.

Figure 4:
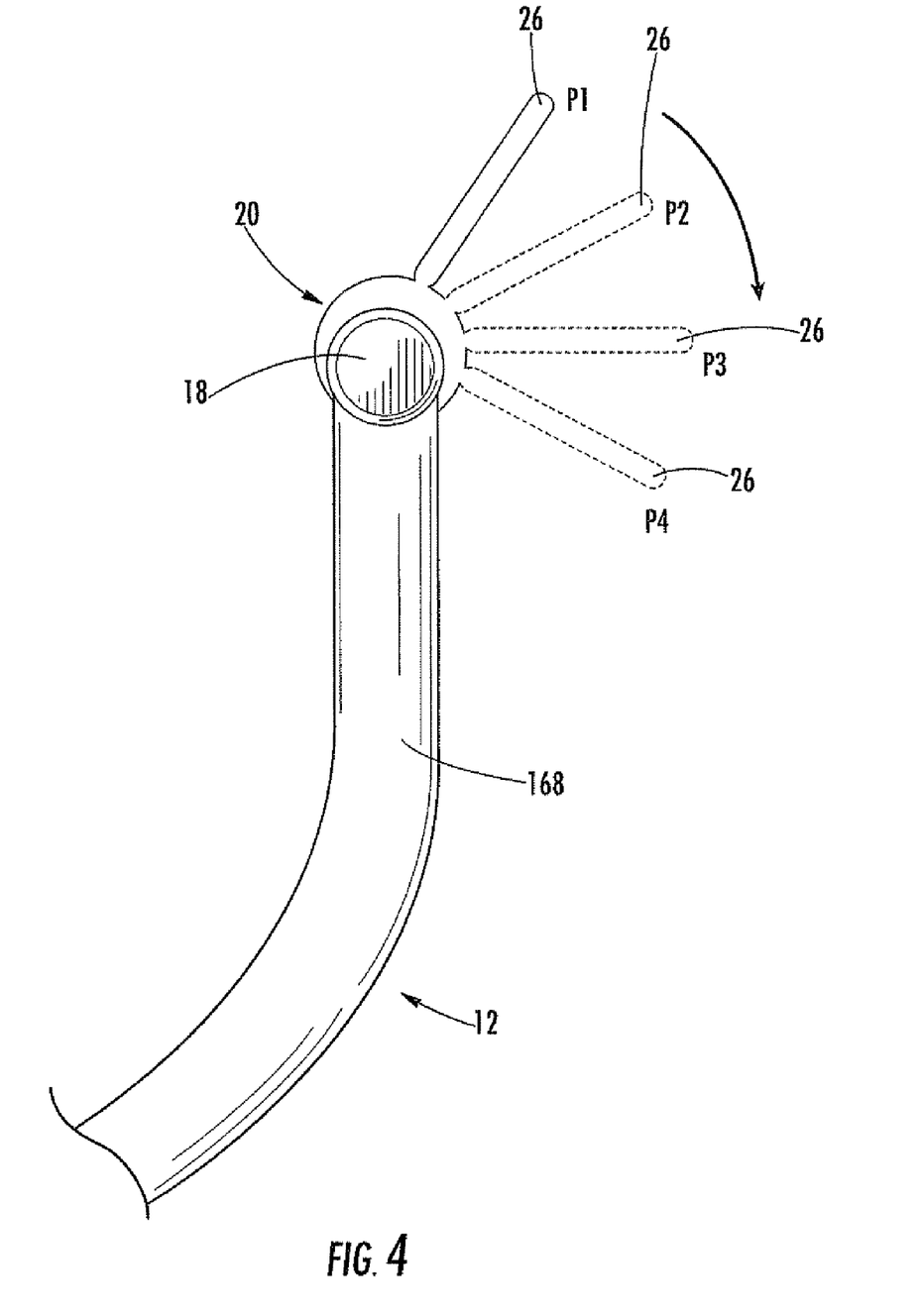
FIG. 4 is a side elevation view of the upper section of a self-propelled mowing machine handle, illustrating the adjustable twist control in progressive lockable starting positions.

With reference to FIG. 4, adjustable twist control 20 is shown in progressive lockable starting positions. Twist control 20 can have multiple starting positions depending on the number of slots 37 in adjustment bracket 32. For example, as illustrated in FIG. 4, adjustment bracket 32 can have four slots 37 that facilitate four starting positions P1 P2, P3, P4, for twist control 20. A user can adjust twist control 20 from position P1 to position P2 by rotating engagement portions 26 in a direction A3 when locking device 60 is in a compressed state by sliding actuator 62 such that tab 66 moves freely in passage groove 36. At the desired starting position, the user can release actuator 62 thereby operably engaging elongate body 22 and adjustment bracket 32, allowing them to rotate in tandem. After the user chooses starting position P1, P2, P3, or P4, twist control 20 can be further rotated as described hereinabove using engagement portions 26 such that the speed of lawn mower LM is controlled by the user. The range and number of starting positions for twist control 20 can be unlimited.

It will be understood that various details of the disclosed subject matter may be changed without departing from the scope of the disclosed subject matter. Furthermore, the foregoing description is for the purpose of illustration only, and not for the purpose of limitation.

What is claimed is:

1. A variable speed, self-propelled mowing machine comprising:
    a housing having a prime mover attached to the housing with a variable speed transmission for propelling the mowing machine;
    a handle attached to the housing; and
    an adjustable variable speed twist control attached to the handle and being rotatably movable on the handle to control the variable speed transmission, the twist control comprising:
        an adjustment bracket rotatably coupled to the handle, the adjustment bracket having a channel for guiding and receiving a pinion cable control connector operably connected to the variable speed transmission; and
        an elongate body selectively engageable to the adjustment bracket;
        wherein when the elongate body is engaged with the adjustment bracket, the elongate body is rotatable in tandem with the adjustment bracket; and
        wherein when the elongate body is not engaged with the adjustment bracket, the elongate body is rotatable independently from the adjustment bracket for placement of the twist control in a plurality of starting positions.

2. The self-propelled mowing machine according to claim 1 wherein the twist control comprises a guide bracket attached to the handle between the handle and the adjustment bracket, the guide bracket having a slot for receiving the pinion cable control connector.

3. The self-propelled mowing machine according to claim 1 wherein the elongate body comprises an actuator having a tab for locking the elongate body to the adjustment bracket in the plurality of starting positions.

4. The self-propelled mowing machine according to claim 1 wherein the twist control comprises two engagement portions on opposing ends of the twist control.

5. A variable speed, self-propelled mowing machine comprising:
    a housing having front, rear, upper and lower portions;
    a handle attached to the rear upper portion of the housing;
    an engine attached to the upper portion of the housing;
    a variable speed transmission for propelling the self-propelled mowing machine; and
    an adjustable variable speed twist control operably connected to the variable speed transmission through a cable for controlling the variable speed transmission whereby self-propelled speed of the self-propelled mowing machine can be controlled by operating the twist control, and wherein the twist control comprises:
        a guide bracket attached to the handle, the guide bracket having a slot for receiving a pinion cable control connector attached to the cable;
        an adjustment bracket rotatably coupled to the guide bracket, the adjustment bracket having a plurality of passage slots defining a plurality of starting positions and further having a channel for guiding and receiving the pinion cable control connector;
        an elongate body coupled to the adjustable adjustment bracket, the elongate body comprising an actuator having a tab portion configured for being received into the passage slots of the adjustment bracket for placement in one of the plurality of starting positions; and
        whereby the elongate body and adjustment bracket are lockably coupled to rotate in tandem about the guide bracket when the tab is received into one of the plurality of passage slots.

6. A variable speed twist control for controlling a variable speed transmission comprising:
    an adjustment bracket for attachment to a handle of a mowing machine for rotational movement on the handle;

an elongate body coupled to the adjustment bracket and rotatably movable about the handle; and wherein the adjustment bracket and the elongate body are configured for selectively locking into a plurality of different positions with respect to each other and rotating in tandem about the handle.

7. A method of controlling propulsion of a self-propelled mowing machine comprising:

providing a variable speed, self-propelled mowing machine comprising:

a housing having a prime mover attached to the housing with a variable speed transmission for propelling the mowing machine;

a handle attached to the housing; and an adjustable variable speed twist control attached to the handle and being rotatably movable on the handle to control the variable speed transmission, the twist control comprising:

an adjustment bracket rotatably coupled to the handle, the adjustment bracket operably connected to the variable speed transmission; and an elongate body selectively engageable to the adjustment bracket for placement of the twist control in a plurality of starting positions;

adjusting the elongate body relative to the adjustment bracket for positioning the twist control in a predetermined starting position; and rotating the elongate body in tandem with the adjustment bracket to control the variable speed transmission whereby the variable speed transmission controls the propulsion speed of the self-propelled mowing machine.

8. The method according to claim 7 wherein rotating the elongate body in tandem with the adjustment bracket increases and decreases the propulsion speed of the self-propelled mowing machine.

9. A method for controlling a variable speed transmission comprising:

providing a variable speed adjustable twist control operably connected to the variable speed transmission through a cable for controlling the variable speed transmission whereby self-propelled speed of the self-propelled mowing machine can be controlled by operating the twist control, and wherein the twist control comprises:

a guide bracket attached to the handle, the guide bracket having a slot for receiving a pinion cable control connector attached to the cable;

an adjustment bracket rotatably coupled to the guide bracket, the adjustment bracket having a plurality of passage slots defining a plurality of starting positions and further having a channel for guiding and receiving the pinion cable control connector;

an elongate body coupled to the adjustment bracket, the elongate body comprising an actuator having a tab portion configured for being received into the passage slots of the adjustment bracket for placement in one of the plurality of starting positions; and whereby the elongate body and adjustment bracket are lockably coupled to rotate in tandem about the guide bracket when the tab is received into one of the plurality of passage slots;

adjusting the elongate body on the adjustment bracket by the actuator for positioning the elongate body in a predetermined starting position; and rotating the twist control so that the pinion cable control connector at least partially traverses within the channel to provide movement to the cable, thereby controlling the variable speed transmission.

* * * * *